US012420637B2

(12) United States Patent
Nose et al.

(10) Patent No.: US 12,420,637 B2
(45) Date of Patent: Sep. 23, 2025

(54) VEHICLE DISPLAY CONTROL DEVICE, VEHICLE DISPLAY CONTROL SYSTEM, AND VEHICLE DISPLAY CONTROL METHOD

(71) Applicant: TOYOTA JIDOSHA KABUSHIKI KAISHA, Toyota (JP)

(72) Inventors: Masashi Nose, Nagoya (JP); Tomoaki Miyazawa, Nagoya (JP); Kazuya Kumazawa, Nagoya (JP); Miki Tsujino, Nagakute (JP); Tsukasa Kitazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 18/490,332

(22) Filed: Oct. 19, 2023

(65) Prior Publication Data

US 2024/0181878 A1    Jun. 6, 2024

(30) Foreign Application Priority Data

Dec. 5, 2022  (JP) .................................. 2022-194441

(51) Int. Cl.
*B60K 35/00*    (2024.01)
*B60K 35/23*    (2024.01)
(Continued)

(52) U.S. Cl.
CPC .............. *B60K 35/00* (2013.01); *B60K 35/23* (2024.01); *B60K 35/28* (2024.01); *B60K 35/81* (2024.01);
(Continued)

(58) Field of Classification Search
CPC ........ B60K 35/00; B60K 35/23; B60K 35/28; B60K 35/81; B60K 2360/162;
(Continued)

(56) References Cited

U.S. PATENT DOCUMENTS 11,837,093 B2 * 12/2023 Patel ..................... G05D 1/0214
2019/0144004 A1 * 5/2019 Mimura ............. G01C 21/3676
                                                                 701/28

(Continued)

FOREIGN PATENT DOCUMENTS

JP    2015101310 A  *  6/2015  ............. B60K 35/00
JP    2020-163932 A    10/2020
(Continued)

OTHER PUBLICATIONS

English Translation KR20220052428A (Year: 2022).*
JP 2015101310 English (Year: 2015).*

*Primary Examiner* — Fernando Alcon
(74) *Attorney, Agent, or Firm* — Oblon, McClelland, Maier & Neustadt, L.L.P.

(57) ABSTRACT

A vehicle display control device is configured to cause display of a vehicle image of a vehicle performing a lane change, at a display area at a periphery of a driver's seat, in a case of a lane change by autonomous driving or a lane change by driving assistance. The vehicle control device comprises a processor. The processor is configured to cause display of a front part of the vehicle image to face a direction of a lane to which the vehicle will move.

3 Claims, 6 Drawing Sheets

(51) Int. Cl.
*B60K 35/28* (2024.01)
*B60K 35/81* (2024.01)

(52) U.S. Cl.
CPC .. *B60K 2360/162* (2024.01); *B60K 2360/175* (2024.01); *B60K 2360/176* (2024.01); *B60Y 2400/92* (2013.01)

(58) Field of Classification Search
CPC ........ B60K 2360/175; B60K 2360/176; B60K 35/22; B60Y 2400/92; B60W 50/14; B60W 30/18163; B60W 2050/146
See application file for complete search history.

(56) References Cited

U.S. PATENT DOCUMENTS

| | | | |
|---|---|---|---|
| 2019/0283770 A1* | 9/2019 | Kubota | B60W 50/082 |
| 2019/0286149 A1* | 9/2019 | Miura | G06V 20/56 |
| 2020/0079379 A1* | 3/2020 | Mimura | B60W 10/04 |
| 2020/0086890 A1* | 3/2020 | Ikeda | G09G 5/37 |
| 2020/0116499 A1* | 4/2020 | Jung | G06V 20/588 |
| 2021/0173095 A1* | 6/2021 | Kang | G01S 19/485 |
| 2022/0161805 A1* | 5/2022 | Lee | B60W 30/095 |
| 2022/0258756 A1* | 8/2022 | Choi | B60K 35/80 |

FOREIGN PATENT DOCUMENTS

| | | | | |
|---|---|---|---|---|
| KR | 2022052428 A | * | 4/2022 | |
| WO | WO-2016152553 A1 | * | 9/2016 | B60K 35/00 |

\* cited by examiner

VEHICLE DISPLAY CONTROL DEVICE, VEHICLE DISPLAY CONTROL SYSTEM, AND VEHICLE DISPLAY CONTROL METHOD

CROSS-REFERENCE TO RELATED APPLICATION

This application is based on and claims priority under 35 USC 119 from Japanese Patent Application No. 2022-194441 filed on Dec. 5, 2022, the disclosure of which is incorporated by reference herein.

BACKGROUND

Technical Field

The present disclosure relates to a vehicle display control device, a vehicle display control system, and a vehicle display control method.

Related Art

Japanese Patent Application Laid-Open (JP-A) No. 2020-163932 discloses a vehicle display device that, in a case in which an autonomous driving control section that performs autonomous driving of a vehicle has provided notification of the occurrence of an event, changes an image displayed at a display from an image of a first person's perspective to an image of a third person's perspective.

However, in the device described in Japanese Patent Application Laid-Open (JP-A) No. 2020-163932, the direction in which a vehicle changes lanes cannot be intuitively understood, and therefore there is room for improvement.

SUMMARY

The present disclosure provides a vehicle display control device, a vehicle display control system, and a vehicle display control method which enable an occupant to intuitively understand a vehicle changing lanes.

A vehicle display control device according to a first aspect is configured to cause display of a vehicle image of a vehicle performing a lane change, at a display area at a periphery of a driver's seat, in a case of a lane change by autonomous driving or a lane change by driving assistance, wherein: the vehicle display control device is configured to cause display of a front part of the vehicle image to face a direction of a lane to which the vehicle will move.

The vehicle display control device according to the first aspect is configured to cause display of a vehicle image of a vehicle performing a lane change, at a display area at a periphery of a driver's seat, in a case of a lane change by autonomous driving or a lane change by driving assistance. This enables an occupant to understand that a lane change is being performed.

Moreover, by causing display of a front part of the vehicle image to face a direction of a lane to which the vehicle will move, it is possible for the occupant to intuitively understand the direction in which the vehicle changes lanes.

A vehicle display control device according to a second aspect is the vehicle display control device according to the first aspect, wherein the vehicle display control device is configured to change an angle of the vehicle image in accordance with a steering angle of the vehicle.

In the vehicle display control device according to the second aspect, since the angle of the vehicle image changes in accordance with the steering angle of the vehicle, the angle of the vehicle image differs between a case in which the vehicle makes a lane change across one lane and a case in which the vehicle makes a lane change across two lanes. This enables movement across plural lanes, in addition to the direction in which the vehicle changes lane, to be intuitively understood.

A vehicle display control device according to a third aspect is the vehicle control device according to the first aspect, wherein: before and after a lane change, the vehicle display control device is configured to cause display of a scheduled travel path of the vehicle at the display area; and the vehicle display control device is configured to interrupt display of the scheduled travel path during the lane change.

In the vehicle display control device according to the third aspect, display of the scheduled travel path is interrupted during a lane change. This enables the occupant to easily understand that a lane change is being performed.

A vehicle display control system according to a fourth aspect includes the vehicle display control device according to any one of the first aspect to the third aspect, and a head-up display device that is configured to project the vehicle image onto a windshield glass of the vehicle, wherein the display area includes a part of the windshield glass onto which the vehicle image is projected by the head-up display device.

In the vehicle display control system according to the fourth aspect, the vehicle image is projected onto the windshield glass of the vehicle, thereby enabling the occupant to easily understand the direction of a lane change in a state in which the occupant is facing forward toward the lane.

A vehicle display control method according to a fifth aspect includes, at a time of displaying a vehicle image of a vehicle performing a lane change, at a display area at a periphery of a driver's seat, in a case of a lane change by autonomous driving or a lane change by driving assistance, displaying a front part of the vehicle image so as to face a direction of a lane to which the vehicle will move.

In the vehicle display control method according to the fifth aspect, at a time of displaying a vehicle image of a vehicle performing a lane change, at a display area at a periphery of a driver's seat, the direction in which the lane change is performed can be intuitively understood by the occupant by displaying a front part of the vehicle image so as to face a direction of a lane to which the vehicle will move.

As described above, the vehicle display control device, the vehicle display control system, and the vehicle display control method according to the present disclosure enable an occupant to be intuitively understand a lane change by a vehicle.

BRIEF DESCRIPTION OF THE DRAWINGS

An exemplary embodiment of the present disclosure will be described in detail based on the following figures, wherein.

DETAILED DESCRIPTION

Explanation follows regarding a vehicle display control system 10 including a vehicle display control device 28 according to an exemplary embodiment, with reference to the drawings. Note that the arrow UP illustrated in FIG. 1 indicates an upper side in a vehicle vertical direction, and the arrow RH indicates a right side in a vehicle width direction. The vertical direction and the left-right direction in the following explanation respectively mean the vertical direction in the vehicle vertical direction and the left-right direction in the vehicle width direction.

Figure 1:
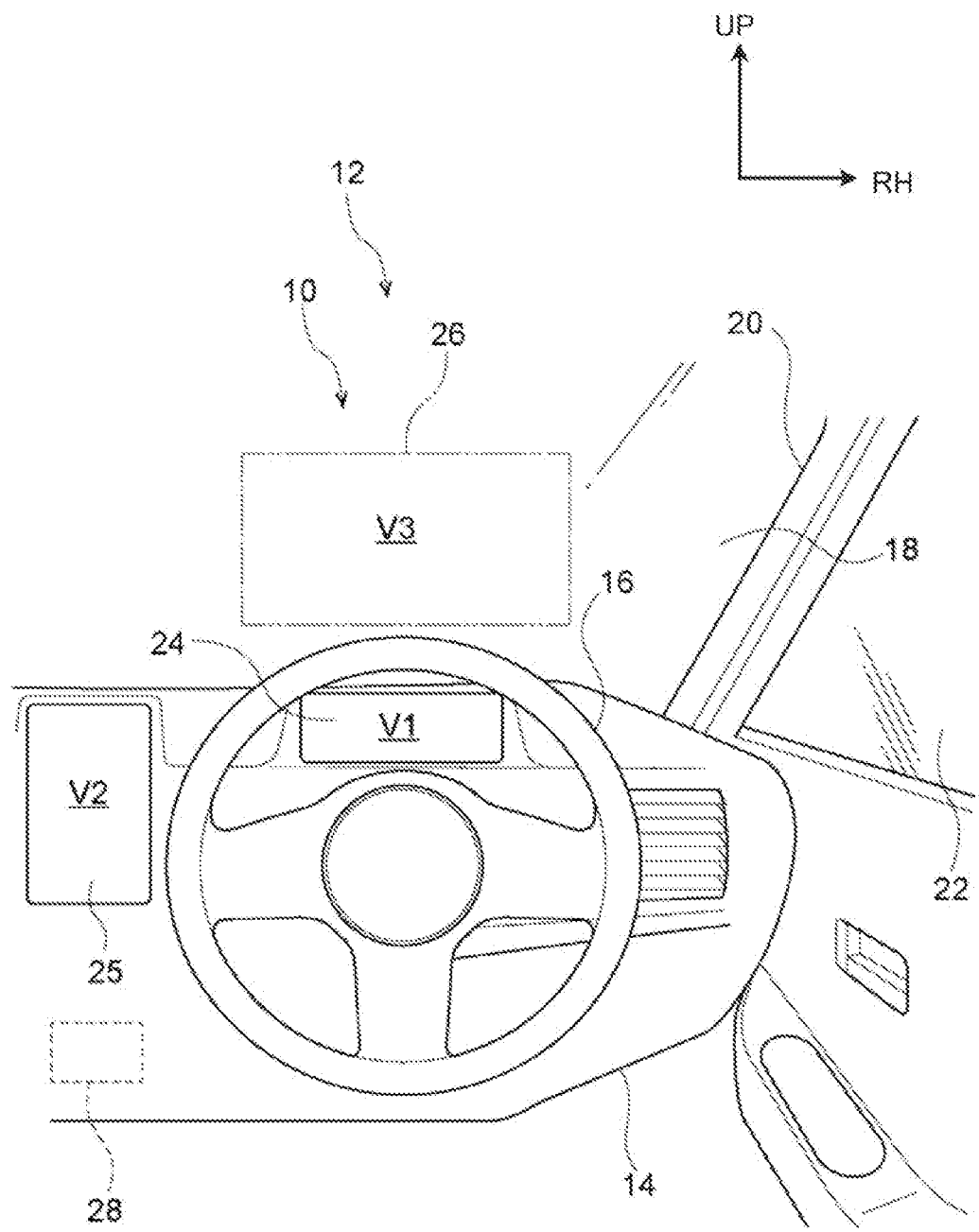
FIG. 1 is a schematic diagram illustrating a front part inside a vehicle cabin, viewed from a vehicle rearward side, of a vehicle to which a vehicle display control device according to an exemplary embodiment has been applied.

As illustrated in FIG. 1, an instrument panel 14 is provided at a front part inside a vehicle cabin of the vehicle 12. The instrument panel 14 extends in the vehicle width direction, and a steering wheel 16 is provided at a vehicle right side of the instrument panel 14. Namely, in the present exemplary embodiment, as an example, a right hand drive vehicle is configured with a steering wheel 16 provided on the right side, and a driver's seat is installed on the right side of the vehicle. Note that there is no limitation thereto, and the present disclosure may be applied to a vehicle in which the driver's seat is installed on the left side of the vehicle.

A windshield glass 18 is provided at a front end part of the instrument panel 14. The windshield glass 18 extends in the vehicle vertical direction and the vehicle width direction to partition the vehicle cabin interior from an exterior of the vehicle cabin.

A vehicle right side end part of the windshield glass 18 is fixed to a front pillar 20 on the vehicle right side. The front pillar 20 extends in the vehicle vertical direction, and the windshield glass 18 is fixed to an inner side end part of the front pillar 20 in the vehicle width direction. Further, a front end part of a front side glass 22 is fixed to an outer side end part of the front pillar 20 in the vehicle width direction. Note that a vehicle left side end part of the windshield glass 18 is fixed to a front pillar (not shown) on the vehicle left side.

A first display 24, which includes a display area V1 for an image, is provided at the instrument panel 14. The first display 24 is configured by a meter display that is provided facing the driver's seat, at the vehicle right side of the instrument panel 14. The first display 24 is connected to various meter devices installed at the vehicle 12, and is provided at a position that enters a field of view of a driver in a state in which the driver has oriented their line of sight forward of the vehicle.

The instrument panel 14 is provided with a second display 25, which includes a display area V2 for an image. The second display 25 is configured by a center display that is provided at a central portion of the instrument panel 14 in the vehicle width direction.

A third display 26, which includes a display area V3 for an image, is provided at the windshield glass 18. The third display 26 is set at a vehicle upper side of the first display 24, and is configured by a projection plane that is projected by a head-up display device 46 (see FIG. 2) serving as a display device. More specifically, the head-up display device 46, which is capable of projecting an image, is provided at a vehicle front side of the instrument panel 14, and an image is projected onto the third display 26 of the windshield glass 18 from the head-up display device 46. Namely, the third display 26 is a part of the windshield glass 18 serving as a projection plane of the head-up display device 46.

Note that the vehicle 12 is provided with the vehicle display control device 28 which configures the vehicle display control system. The vehicle display control device 28 of the present exemplary embodiment is, for example, an electronic control unit (ECU) that performs various control.

Hardware Configuration of the Vehicle Display Control Device 28

Figure 2:
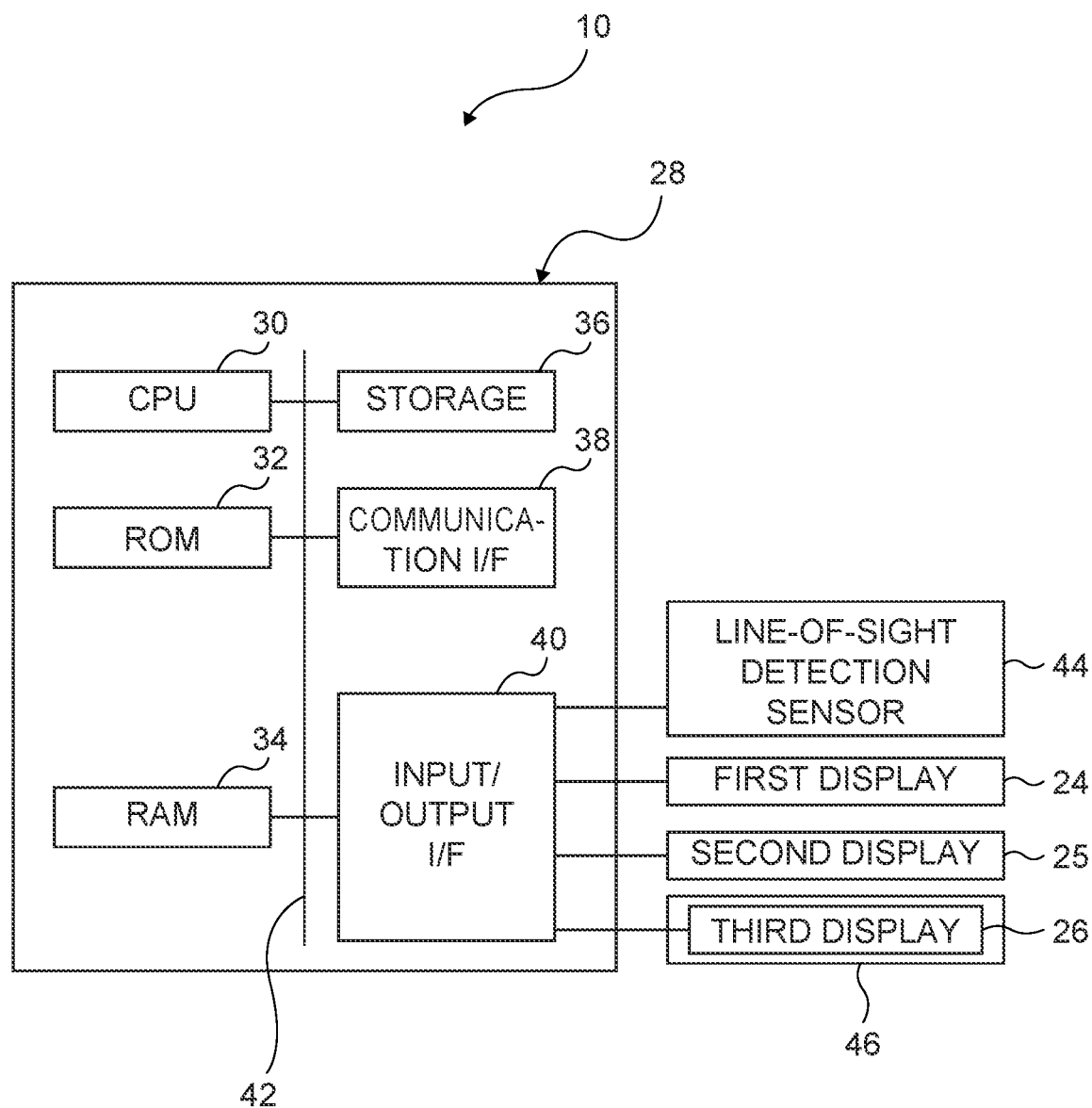
FIG. 2 is a block diagram illustrating a hardware configuration of a vehicle display control device according to an exemplary embodiment.

As illustrated in FIG. 2, the vehicle display control device 28 includes a central processing unit (CPU; serving as a processor) 30, read only memory (ROM) 32, random access memory (RAM) 34, storage 36, a communication interface (communication I/F) 38, and an input/output interface (input/output I/F) 40. These respective configurations are communicably connected to each other via an internal bus 42.

The CPU 30 is a central processing unit that executes various programs and controls various components. Namely, the CPU 30 reads a program from the ROM 32 or the storage 36, and executes the program using the RAM 34 as a workspace. Further, the CPU 30 controls the respective configurations described above and performs a variety of computation processing in accordance with programs stored in the ROM 32 or the storage 36.

The ROM 32 stores various programs and various data. The RAM 34 serves as a workspace to temporarily store programs and data. The storage 36 is configured by a hard disk drive (HDD) or a solid state drive (SSD), and is a non-transitory storage medium that stores various programs including an operating system, as well as various data. In the present exemplary embodiment, a display program or the like for performing display processing is stored in the ROM 32 or the storage 36.

The communication I/F 38 is an interface for the vehicle display control device 28 to communicate with a server and other devices and, for example, a protocol such as a controller area network (CAN), Ethernet (registered trademark), long term evolution (LTE), a fiber distributed data interface (FDDI), or Wi-Fi (registered trademark) is used.

The input/output I/F 40 is connected to a line-of-sight detection sensor 44, the first display 24, the second display 25, and the head-up display device 46. Moreover, the head-up display device 46 projects an image onto the third display 26.

The line-of-sight detection sensor 44 is provided, for example, at the instrument panel 14, and is disposed facing the face of an occupant (driver) who is seated in the driver's seat. The line-of-sight detection sensor 44 then detects a direction of the line of sight of the occupant using a principle such as corneal reflex or scleral reflex by recognizing the eye of the occupant.

Functional Configuration of the Vehicle Display Control Device 28

The vehicle display control device 28 implements various functions using the above-described hardware resources. Explanation follows regarding functional configurations implemented by the vehicle display control device 28, with reference to FIG. 3.

Figure 3:
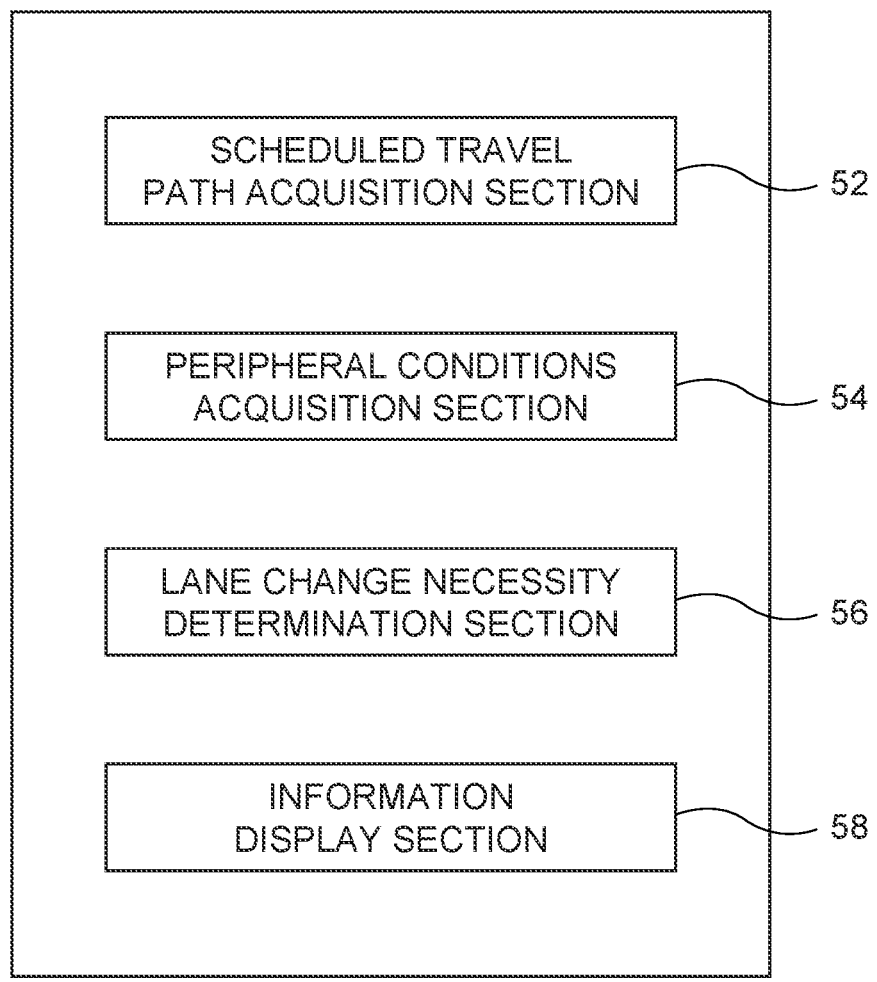
FIG. 3 is a block diagram illustrating a functional configuration of a vehicle display control device according to an exemplary embodiment.

As illustrated in FIG. 3, the functional configuration of the vehicle display control device 28 includes a scheduled travel path acquisition section 52, a peripheral conditions acquisition section 54, a lane change necessity determination section 56, and an information display section 58. Note that the respective functional configurations are implemented by the CPU 30 reading and executing programs stored in the ROM 32 or the storage 36.

The scheduled travel path acquisition section 52 acquires information relating to a scheduled travel path set by a navigation system or the like. For example, an occupant inputs a destination into a navigation system or the like, thereby setting a scheduled travel path to the destination. The scheduled travel path includes information regarding roads which are scheduled to be traveled, as well as position information of intersections that change a travel path, such as a left turn or a right turn. Moreover, in a case in which a highway is included in the scheduled travel path, the location information of a branch road, the location information of the entrance or exit of the highway, and the like are included.

Note that the scheduled travel path may be stored in storage or the like installed at the vehicle 12, or may be stored outside the vehicle 12, such as in a server. In a case in which the scheduled travel path is stored in the storage of the vehicle 12, the scheduled travel path acquisition section 52 accesses the storage to acquire information of the scheduled travel path. Further, in a case in which a scheduled travel path is stored in a server or the like outside the vehicle 12, the scheduled travel path acquisition section 52 may acquire the scheduled travel path from the server via the communication I/F 38.

The peripheral conditions acquisition section 54 acquires peripheral conditions of the vehicle 12 based on signals from plural sensors installed at the vehicle 12. For example, the vehicle 12 is installed with cameras such as a forward camera that captures images of in front of the vehicle, a rearward camera that captures images of rearward of the vehicle, and a side camera that captures images of to the sides of the vehicle. Moreover, radars and the like are installed at the vehicle 12 in order to detect obstructions in the periphery of the vehicle. The peripheral conditions acquisition section 54 acquires information regarding other vehicles traveling in the periphery of the vehicle 12, and information regarding, for example, obstructions, based on the signals received from these cameras and radars.

The lane change necessity determination section 56 determines whether or not a lane change is necessary, based on at least one of the scheduled travel path or the peripheral conditions. For example, based on the information relating to the scheduled travel path acquired by the scheduled travel path acquisition section 52, in a situation in which a location for a left turn or a right turn of the vehicle is approaching, in a case in which the vehicle is traveling in a lane that is different from the lane in which the left turn or right turn will be performed, the lane change determination section 56 determines that a lane change is necessary.

Moreover, the lane change necessity determination section 56 determines that a lane change to a lane adjacent to a branch road is necessary in a case in which the vehicle is traveling in a lane that is not adjacent to the branch road in a situation in which the entry point to the branch road is approaching.

Moreover, the lane change necessity determination section 56 determines that a lane change to a lane that connects to an entrance or an exit is necessary in a case in which a lane that is different from the lane that connects to the entrance or exit is being traveled in, in a situation such as a case in which an entrance or exit of a highway is approaching.

Furthermore, based on the peripheral conditions around the vehicle 12 acquired by the peripheral conditions acquisition section 54, in a case in which the speed of a vehicle traveling ahead is slow, the lane change necessity determination section 56 determines that a lane change for the purpose of overtaking is necessary. For example, in a state in which active cruise control (ACC) serving as a driving assistance function is enabled, in a case in which the speed of a vehicle traveling ahead is slower than a set speed of the ACC, and in a case in which the distance to the vehicle traveling ahead is less than a predetermined distance, the lane change necessity determination section 56 may determine that a lane change is necessary for the purpose of overtaking the vehicle.

Moreover, the lane change necessity determination section 56 determines that a lane change is necessary in a case in which an obstruction, such as a fallen object, is detected ahead in the lane of travel from the peripheral conditions of the vehicle 12 which are acquired by the peripheral conditions acquisition section 54, in order to avoid the obstruction.

The information display section 58 causes display of an image or the like of the vehicle at at least one display area of the display area V1, the display area V2, or the display area V3. In particular, in the present exemplary embodiment, the front part of the vehicle image is displayed facing the direction of the lane to which the vehicle will move.

Figure 4:
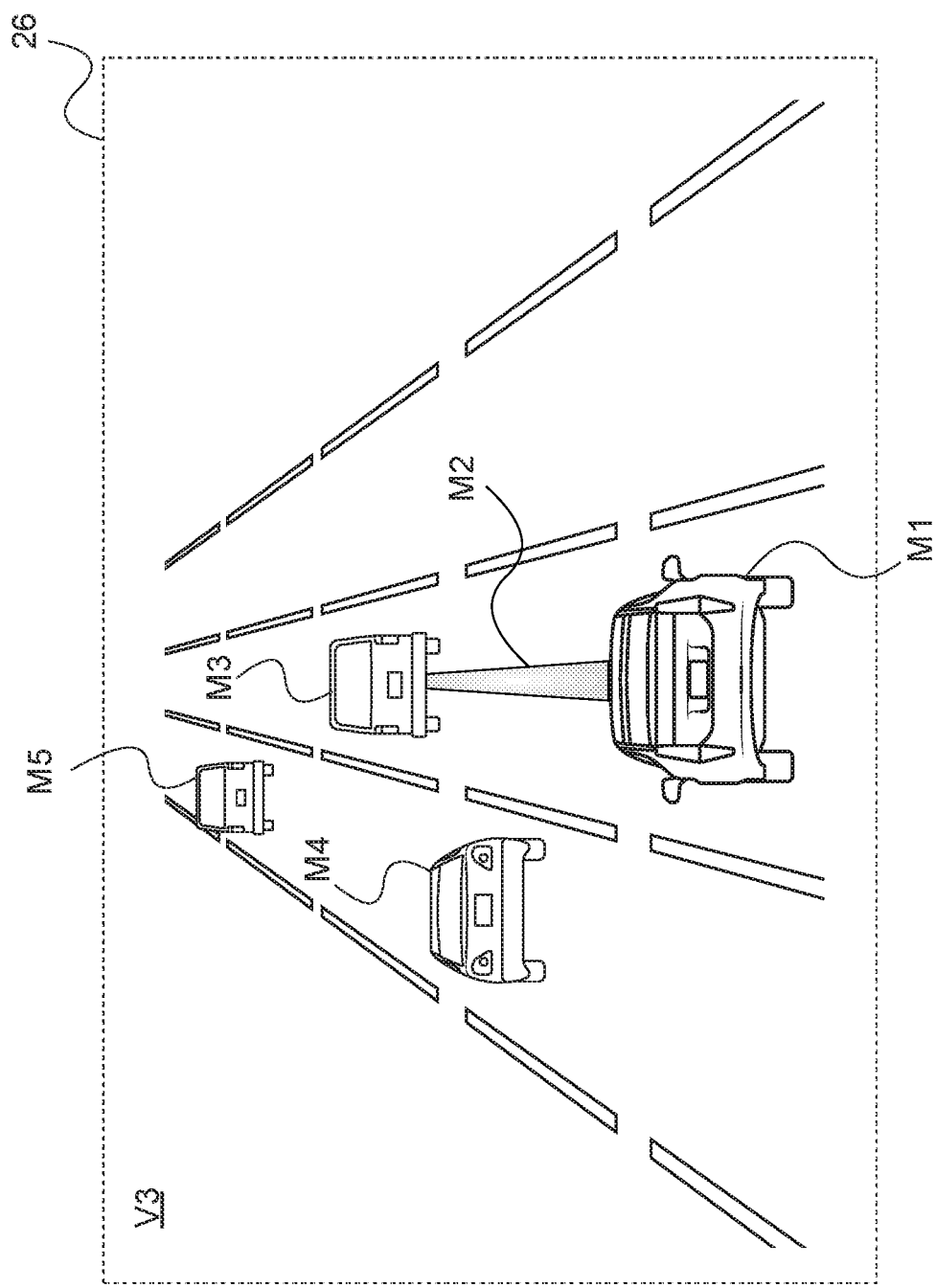
FIG. 4 is a diagram illustrating a display example of a display area in an exemplary embodiment, and illustrates a normal travel state before a lane change is performed.
Figure 5:
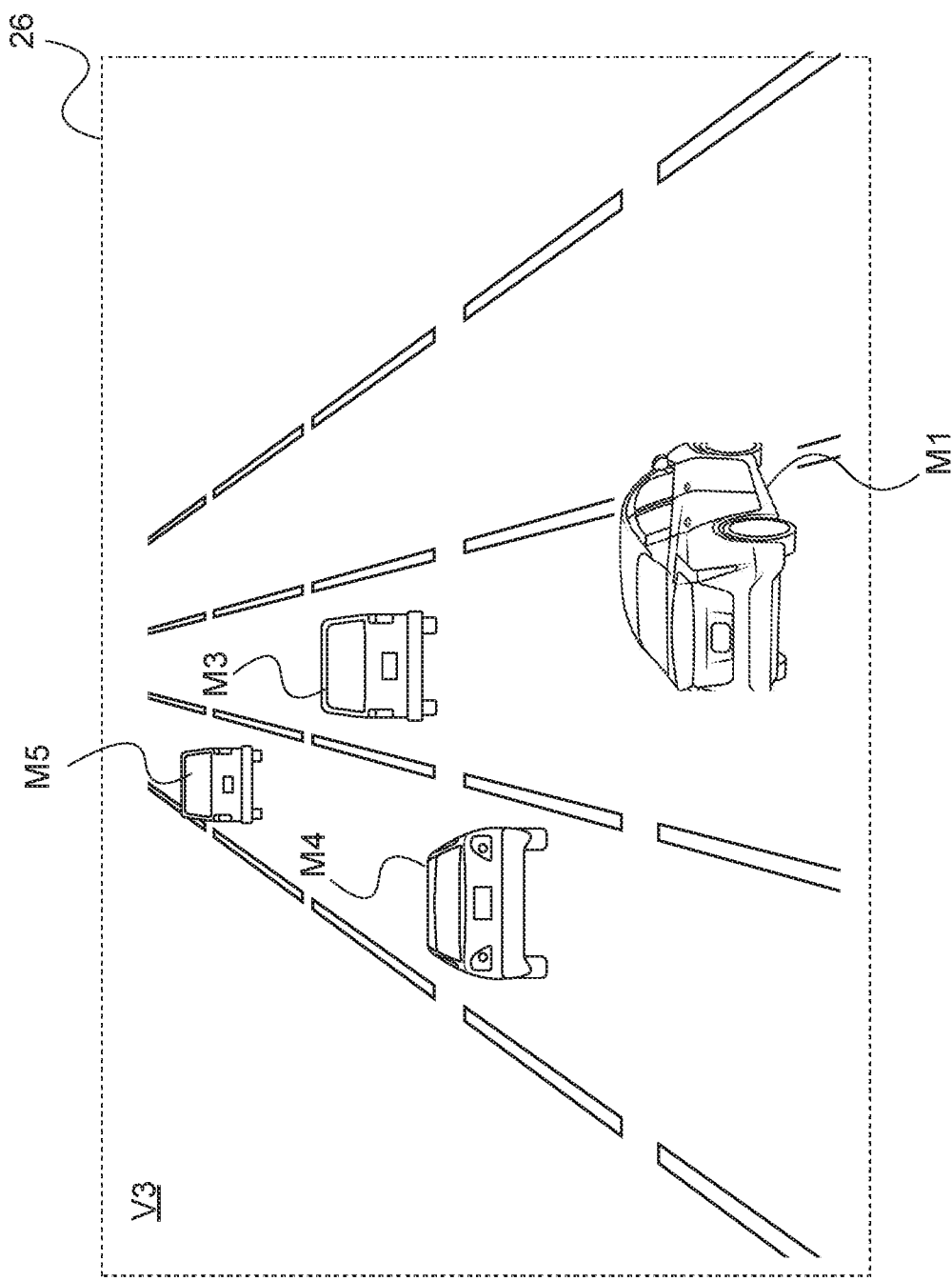
FIG. 5 is a diagram illustrating a display example of a display area in an exemplary embodiment, and illustrates a state during a lane change.

Explanation follows regarding an example of display performed by the information display section 58, with reference to FIG. 4 and FIG. 5. Note that in FIG. 4 and FIG. 5, the vehicle 12 is traveling on a highway, and autonomous driving or a driving assistance function is enabled.

FIG. 4 is a diagram illustrating a display example of the display area V3 in the present exemplary embodiment, and illustrates a normal travel state before a lane change is performed. As illustrated in FIG. 4, an image of a lane corresponding to an actual lane of travel is displayed at the display area V3. Further, a vehicle image M1 simulating the vehicle 12 is displayed at the lower part of the display area V3, and a scheduled travel path M2 forward from the vehicle image M1 is displayed.

Moreover, other vehicle images M3 to M5, which simulate other vehicles traveling around at a periphery of vehicle 12, are displayed at the display area V3. The other vehicle image M3 indicates another vehicle traveling ahead of the vehicle 12 in the same lane as the vehicle 12. Further, the other vehicle image M4 and the other vehicle image M5 indicate other vehicles traveling in a lane immediately to the left of the lane in which the vehicle 12 is traveling.

FIG. 5 is an example of display of the display area V3 in a state during a lane change. As illustrated in FIG. 5, the vehicle image M1 corresponding to the vehicle 12 that is changing lanes to the right adjacent lane is displayed. More specifically, the vehicle image M1 moves to the right side of the lane of travel, and the front part of the vehicle image M1 is displayed facing the direction of the lane to which the vehicle will move.

In the present exemplary embodiment, the information display section 58 causes display of the vehicle image M1 and varies the angle of the vehicle image M1 according to the steering angle of the vehicle 12. Namely, as illustrated in FIG. 5, in a case in which a lane change is performed from the center lane to the right lane, and in a case in which movement across two lanes is performed by moving from the left lane to the right lane across the center lane, the vehicle image M1 is displayed with the angle of the vehicle image M1 varying.

Moreover, in the present exemplary embodiment, during a lane change, the display of the scheduled travel path M2 by the information display section 58 is interrupted. More specifically, the information display section 58 interrupts display of the scheduled travel path M2 immediately before a lane change is executed. Further, after a lane change has been completed, the information display section 58 restores display of the scheduled travel path M2.

Operation

Next, explanation follows regarding operation of the present exemplary embodiment.

Display Processing

Figure 6:
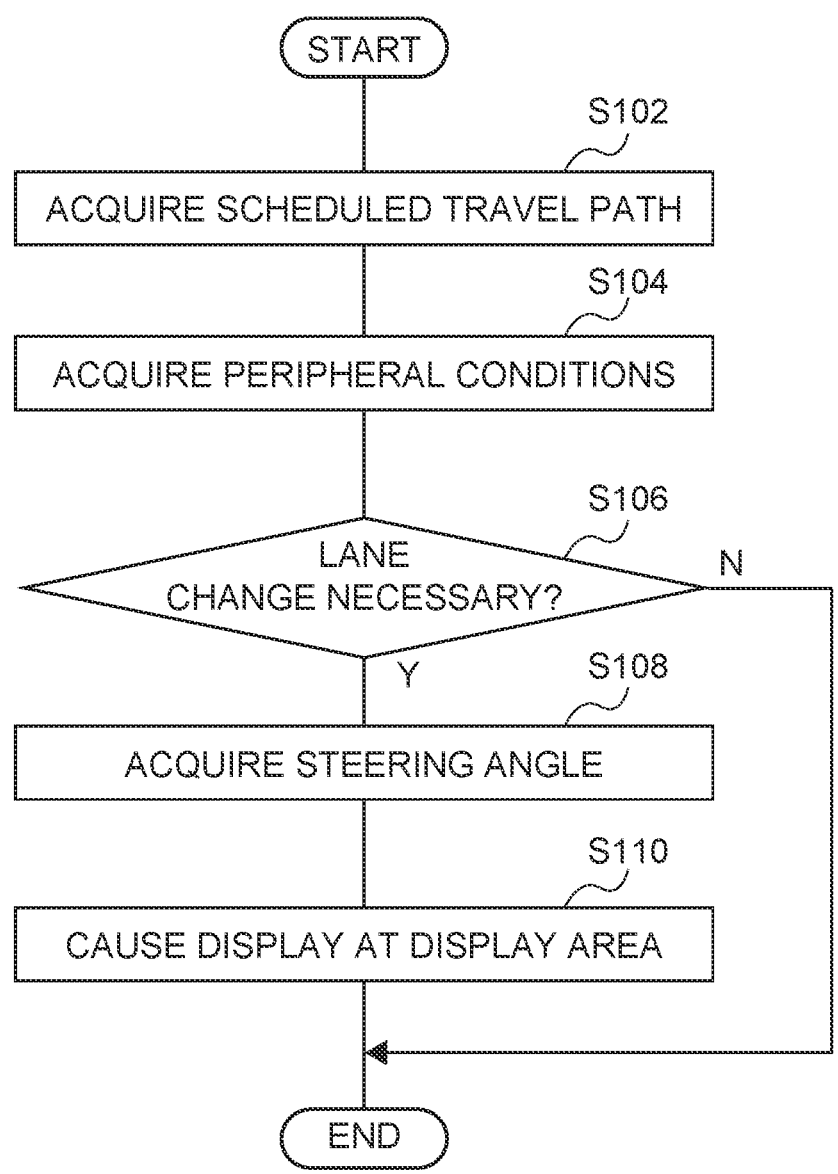
FIG. 6 is a flowchart illustrating an example of display processing according to an exemplary embodiment.

Explanation follows regarding an example of display processing in which information relating to a lane change is caused to be displayed at the third display 26, which is the projection plane of the head-up display device 46, with reference to the flowchart illustrated in FIG. 6. The display processing is executed by the CPU 30 reading a display program from the ROM 32 or the storage 36, and loading and executing the display program in the RAM 34. Note that in the present exemplary embodiment, as an example, the display processing is executed in a case in which the vehicle 12 is traveling on a highway and autonomous driving or a driving assistance function is enabled.

At step S102, the CPU 30 acquires information relating to the scheduled travel path. More specifically, using the functionality of the scheduled travel path acquisition section 52, the CPU 30 acquires the scheduled travel path of the vehicle 12. For example, the CPU 30 may acquire only the scheduled travel path until the time of an event at which a nearest lane change is necessary.

At step S104, the CPU 30 acquires the peripheral conditions. More specifically, using the functionality of the peripheral conditions acquisition section 54, the CPU 30 acquires the peripheral conditions of the vehicle 12.

At step S106, the CPU 30 determines whether or not a lane change of the vehicle 12 is necessary. More specifically, using the functionality of the lane change necessity determination section 56, the CPU 30 determines whether or not a lane change is necessary, based on the information acquired by the scheduled travel path acquisition section 52 and the information acquired by the peripheral conditions acquisition section 54.

In a case in which the CPU 30 determines at step S106 that a lane change is necessary, the processing transitions to step S108. On the other hand, in a case in which the CPU 30 determines at step S106 that a lane change is not necessary, the display processing is ended.

At step S108, the CPU 30 acquires the steering angle of the vehicle 12. More specifically, the CPU 30 acquires steering angle information from a steering ECU or the like of the vehicle 12.

At step S110, the CPU 30 causes display of the vehicle image M1 at a predetermined display area. At this time, the CPU 30 causes display of the front part of the vehicle image M1 facing the direction of the lane to which the vehicle will move. Moreover, the CPU 30 changes the angle of the vehicle image M1 according to the steering angle acquired at step S108.

Note that, together with the display illustrated in FIG. 5, autonomous driving functionality or driving assistance functionality installed at the vehicle 12 controls steering, acceleration, and the like to execute a lane change of the vehicle 12.

As described above, the vehicle display control system 10 including the vehicle display control device 28 according to the present exemplary embodiment cause display of the vehicle image M1, which is to undergo a lane change, at at least one of the display area V1, the display area V2, or the display area V3 which are at a periphery of the driver's seat, at the time of a lane change by autonomous driving or at the time of a lane change by driving assistance. This enables an occupant to understand that a lane change is being performed. In particular, in the present exemplary embodiment, the vehicle image M1 is projected onto the display area V3 of the windshield glass 18, enabling an occupant to easily understand the direction of a lane change in a state in which the occupant is facing forward toward the lane.

Moreover, in the present exemplary embodiment, the front part of the vehicle image M1 is displayed facing the direction of the lane to which the vehicle will move, enabling the occupant to intuitively understand the direction in which the vehicle 12 changes lanes.

Moreover, in the present exemplary embodiment, since the angle of the vehicle image M1 is displayed varying according to the steering angle, the angle of the vehicle image M1 differs between a case in which the vehicle makes a lane change across one lane and a case in which the vehicle makes a lane change across two lanes. This enables movement across plural lanes, in addition to the direction in which the vehicle changes lane, to be intuitively understood.

Moreover, in the present exemplary embodiment, display of the scheduled travel path M2 is interrupted during a lane change. This enables the occupant to easily understand that a lane change is being performed.

Although explanation has been given regarding the vehicle display control system 10, the vehicle display control device 28, and the vehicle 12 according to the present exemplary embodiment, obviously various embodiments may be implemented within a range not departing from the gist of the present disclosure. For example, although explanation has been given regarding a configuration in which information relating to a lane change is displayed at the display area V3 of the third display 26 in the above-described exemplary embodiment, there is no limitation thereto. For example, a configuration may be adopted in which information relating to a lane change is displayed in the display area V1 of the first display 24 or the display area V2 of the second display 25.

Alternatively, information relating to a lane change may be displayed at plural display areas from among the display area V1, the display area V2, and the display area V3.

Moreover, in a case in which the vehicle image M1 is displayed at the display area V3, the display position of the vehicle image M1 may be changed according to the direction of the line of sight of the occupant. For example, the line-of-sight detection sensor 44 may detect the direction of the line of sight of an occupant, and based on this direction of line of sight, the display position of the vehicle image M1 may be adjusted.

Although the display of the scheduled travel path M2 is interrupted during a lane change in the above-described exemplary embodiment, there is no limitation thereto. The direction of a lane change may be understood by visually checking both the scheduled travel path M2 and the vehicle image M1.

Further, although the angle of the vehicle image M1 is changed in accordance with the steering angle of the vehicle 12 and displayed in the above-described exemplary embodiment, there is no limitation thereto. For example, the vehicle image M1 may be displayed at an angle corresponding to a predetermined angle regardless of the steering angle of the vehicle 12. Even in this case, the direction of a lane change can be understood by looking at the direction in which the vehicle image is angled.

Moreover, in the above-described exemplary embodiment, although the lane change necessity determination section 56 determines whether or not a lane change is necessary based on at least one of the information relating to the scheduled travel path acquired by the scheduled travel path acquisition section 52 or the peripheral conditions of the vehicle 12 acquired by the peripheral conditions acquisition section 54, there is no limitation thereto. For example, the lane change necessity determination section 56 may determine whether or not a lane change is necessary based on only the information relating to the scheduled travel path acquired by the scheduled travel path acquisition section 52. Alternatively, the lane change necessity determination section 56 may determine whether or not a lane change is necessary based on only the peripheral conditions of the vehicle 12 acquired by the peripheral conditions acquisition section 54.

Further, in the above-described exemplary embodiment, any of various types of processors other than the CPU 30 may execute the processing that the CPU 30 executes by reading a program. Examples of such processors include a Programmable Logic Device (PLD) in which the circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). Further, the above-described processing may be executed by one of these various types of processors, or may be executed by combining two or more of the same type or different types of processors, for example, the above-described processing may be executed by plural FPGAs, or a combination of a CPU and an FPGA, or the like. Moreover, a hardware configuration of the various processors is specifically formed as an electric circuit combining circuit elements such as semiconductor elements.

In addition, although various data is stored in the storage 36 in the above-described exemplary embodiment, there is no limitation thereto. For example, a non-transitory recording medium such as a compact disc (CD), a digital versatile disc (DVD), or universal serial bus (USB) memory may act as a storage section. In this case, various programs, data, and the like are stored in these storage media.

Moreover, the flow of processing described in the above-described exemplary embodiment is an example, and unnecessary steps may be deleted, new steps may be added, or the processing order may be rearranged within a range not departing from the spirit of the present disclosure.

Further, the display processing described in the above-described exemplary embodiment is applicable both during autonomous driving of a vehicle that is capable of autonomous driving and during manual driving of a vehicle that is capable of autonomous driving. The present disclosure is also applicable to manual driving of a vehicle that is only capable of manual driving, and to autonomous driving of a vehicle that is only capable of autonomous driving.

What is claimed is:

1. A vehicle display control device that is configured to cause display of a vehicle image simulating a vehicle steered for performing a lane change, at a display area at a periphery of a driver's seat, in a case of a lane change by autonomous driving or a lane change by driving assistance, the vehicle control device comprising:
   a processor configured to:
   acquire a scheduled travel path of the vehicle,
   display the scheduled travel path of the vehicle at the display area,
   acquire peripheral conditions of the vehicle,
   determine if the lane change is necessary based on at least one of the scheduled travel path of the vehicle and the peripheral conditions of the vehicle, and
   when it is determined that the lane change is necessary
      interrupt display of the scheduled travel path of the vehicle at the display area,
      acquire a steering angle of the vehicle, and
      cause the vehicle image to display to change an angle of the vehicle image with a front part of the vehicle image to face a direction of a lane to which the vehicle will move according to the acquired steering angle,
   wherein the processor is configured to display the scheduled travel path of the vehicle at the display area after the lane change has been completed.

2. A vehicle display control system comprising:
   the vehicle display control device according to claim 1, and a head-up display device that is configured to project the vehicle image onto a windshield glass of the vehicle,
   wherein the display area includes a part of the windshield glass onto which the vehicle image is projected by the head-up display device.

3. A vehicle display control method comprising:
   acquiring a scheduled travel path of a vehicle,
   displaying a vehicle image simulating the vehicle and the scheduled path of the vehicle, at a display area at a periphery of a driver's seat,
   acquiring peripheral conditions of the vehicle,
   determining if a lane change is necessary based on at least one of the scheduled travel path of the vehicle and the peripheral conditions of the vehicle, and
   when it is determined that the lane change is necessary
      interrupting display of the scheduled travel path of the vehicle at the display area,
      acquiring a steering angle of the vehicle, and
      displaying to change an angle of the vehicle image with a front part of the vehicle image so as to face a direction of a lane to which the vehicle will move according to the acquired steering angle,
   wherein the scheduled travel path of the vehicle is displayed at the display area after the lane change has been completed.

* * * * *